(12) United States Patent
Chang et al.

(10) Patent No.: US 12,401,561 B2
(45) Date of Patent: Aug. 26, 2025

(54) RADIO LINK FAILURE REPORTING METHOD AND USER EQUIPMENT

(71) Applicant: Sharp Kabushiki Kaisha, Sakai (JP)

(72) Inventors: Ningjuan Chang, Shanghai (CN); Renmao Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 448 days.

(21) Appl. No.: 17/912,294

(22) PCT Filed: Mar. 25, 2021

(86) PCT No.: PCT/CN2021/083040
§ 371 (c)(1),
(2) Date: Sep. 16, 2022

(87) PCT Pub. No.: WO2021/190608
PCT Pub. Date: Sep. 30, 2021

(65) Prior Publication Data
US 2023/0164866 A1    May 25, 2023

(30) Foreign Application Priority Data
Mar. 26, 2020 (CN) .......................... 202010226127.0

(51) Int. Cl.
*H04L 1/00*    (2006.01)
*H04L 41/00*    (2022.01)
(Continued)

(52) U.S. Cl.
CPC ............. *H04L 41/00* (2013.01); *H04W 76/20* (2018.02); *H04W 76/38* (2018.02)

(58) Field of Classification Search
CPC ..... H04W 24/02; H04W 24/10; H04W 76/19; H04W 76/20; H04W 76/27; H04W 76/38;
(Continued)

(56) References Cited

U.S. PATENT DOCUMENTS 10,999,885 B1 *  5/2021  Shih ................... H04W 36/0011
12,133,121 B2 * 10/2024  Lee .................... H04W 52/0229
(Continued)

FOREIGN PATENT DOCUMENTS

CN          103460750 A      12/2013

OTHER PUBLICATIONS

Official Communication issued in International Patent Application No. PCT/CN2021/083040, mailed on Jun. 23, 2021.
(Continued)

*Primary Examiner* — Jenee Holland
(74) *Attorney, Agent, or Firm* — Keating & Bennett, LLP

(57) ABSTRACT

The present disclosure provides a radio link failure reporting method and user equipment. The radio link failure reporting method comprises: user equipment (UE) detecting a radio link failure (RLF) of a master cell group (MCG); the UE initiating a fast MCG link recovery procedure to recover a connection to a network side; the UE transmitting a radio link failure report to the network side, wherein the radio link failure report comprises first fast MCG link recovery information, and the first fast MCG link recovery information is used to indicate that the UE has attempted a fast MCG link recovery function based on the fast MCG link recovery procedure after a radio link corresponding to the radio link failure report fails.

3 Claims, 3 Drawing Sheets

(51) Int. Cl.
  *H04L 41/0654* (2022.01)
  *H04L 41/0813* (2022.01)
  *H04W 24/02* (2009.01)
  *H04W 24/10* (2009.01)
  *H04W 76/19* (2018.01)
  *H04W 76/20* (2018.01)
  *H04W 76/27* (2018.01)
  *H04W 76/38* (2018.01)

(58) Field of Classification Search
  CPC .. H04L 41/00; H04L 41/0654; H04L 41/0813
  See application file for complete search history.

(56) References Cited

U.S. PATENT DOCUMENTS

| | | | | |
|---|---|---|---|---|
| 12,193,097 | B2* | 1/2025 | Hori | H04W 36/185 |
| 2012/0276897 | A1 | 11/2012 | Kwon et al. | |
| 2019/0289510 | A1* | 9/2019 | Rugeland | H04W 36/0079 |
| 2019/0357292 | A1* | 11/2019 | Cirik | H04W 72/23 |
| 2020/0267794 | A1* | 8/2020 | Baek | H04W 76/27 |
| 2020/0359241 | A1* | 11/2020 | Siomina | H04W 24/08 |
| 2021/0266811 | A1* | 8/2021 | Hwang | H04W 28/06 |
| 2021/0337616 | A1* | 10/2021 | Zhang | H04W 36/305 |
| 2022/0110180 | A1* | 4/2022 | Jung | H04W 76/30 |
| 2022/0159530 | A1* | 5/2022 | Kim | H04W 36/362 |
| 2023/0086398 | A1* | 3/2023 | Teyeb | H04W 76/19 |
| 2023/0127850 | A1* | 4/2023 | Teyeb | H04W 36/00698 370/329 |
| 2023/0164866 | A1* | 5/2023 | Chang | H04L 41/00 370/329 |
| 2023/0262540 | A1* | 8/2023 | Kim | H04W 36/362 370/216 |
| 2023/0413088 | A1* | 12/2023 | Sedin | H04W 24/08 |

OTHER PUBLICATIONS

"3rd Generation Partnership Project; Technical Specification Group Radio Access Network; NR; Radio Resource Control (RRC) protocol specification (Release 15)", 3GPP TS 38.331 V15.8.0, Dec. 2019, pp. 1-532.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.8.0, Dec. 2019, pp. 1-964.

Ericsson et al., "Revised WID: Multi-RAT Dual-Connectivity and Carrier Aggregation enhancements", 3GPP TSG-RAN#83, RP-190452, Mar. 18-21, 2019, 5 pages.

Ericsson, "Fast MCG recovery", 3GPP TSG-RAN WG2 Meeting #109-e, R2-2002137, Feb. 24-Mar. 6, 2020, pp. 1-7.

China Telecom et al., "New Work Item on even further Mobility enhancement in E-UTRAN", 3GPP TSG RAN meeting #83, RP-190272, Mar. 18-21, 2019, 4 pages.

Intel Corporation, "New WID: NR mobility enhancements", 3GPP TSG RAN Meeting #80, RP-181433, May 21-25, 2018, 5 pages.

* cited by examiner

RADIO LINK FAILURE REPORTING METHOD AND USER EQUIPMENT

TECHNICAL FIELD

The present disclosure relates to the technical field of wireless communications. More specifically, the present disclosure relates to a method for radio link failure recovery and corresponding user equipment.

BACKGROUND

A new research project on 5G technology standards (see non-patent literature: RP-181433: New WID on NR (New Radio) mobility enhancements) was approved in the 3rd Generation Partnership Project (3GPP) RAN #80 plenary session held in June 2018. In addition, there is another new research project on Release 16 (see non-patent literature: RP-190272: WID for Even Further Mobility Enhancement in Evolved-Universal Terrestrial Radio Access Network (E-UTRAN)). One of the research objectives of these two projects is to meet one of the mobility requirements in a network: seamless handover, namely, to achieve a handover interruption time of 0 millisecond or close to 0 millisecond in a cell handover procedure and to improve the robustness of a handover. Among currently studied solutions for reducing a handover interruption time and/or to improve the robustness of a handover, a solution is referred to as a conditional handover (CHO). In a CHO mechanism, a base station issues a handover command to UE (user equipment) in advance, wherein the handover command includes a handover execution condition configuration. The UE executes a handover according to the previously received and stored handover command only when the configured handover execution condition is met. In this case, by issuing the handover command in advance, the success rate of receiving a handover command can be improved, thereby improving the success rate of a handover, and avoiding a service interruption delay caused by a handover failure resulting from a failure in receiving a handover command.

In addition, the 3GPP RAN2 working group introduced a fast MCG (master cell group) link recovery function in Release 16. The fast MCG link recovery function is provided relative to the existing link recovery function (that is, a link connection is recovered by means of an RRC connection re-establishment procedure). In the fast MCG link recovery function, when an RLF (radio link failure) occurs in an MCG of the UE, if the link quality of a secondary cell group (SCG) of the UE is good, then the UE initiates an MCG failure information procedure to report the MCG link failure information to a master base station through an SCG link, instead of directly triggering an RRC connection re-establishment procedure. The master base station receiving the MCG link failure information report may transmit an RRC connection reconfiguration message to the UE to trigger a handover of the UE to a new cell or transmit an RRC release message to release the connection of the UE.

The present disclosure proposes a solution to the issue of link failure reporting when a fast MCG link recovery function or a CHO is configured in an NR system and an LTE (Long Term Evolution) system.

SUMMARY

The purpose of embodiments of the present disclosure is to propose a solution to the issue of implementing radio link failure reporting when a fast MCG link recovery function or a CHO is configured in an NR system and an LTE system. More specifically, the present disclosure proposes a solution to the issue of how to set relevant link recovery information in a radio link failure report when a fast MCG link recovery function or a CHO recovery mechanism is executed to recover a link. The embodiments of the present disclosure provide a radio link failure reporting method performed in user equipment and corresponding user equipment.

According to a first aspect of the present disclosure, proposed is a radio link failure reporting method, comprising: user equipment (UE) detecting a radio link failure (RLF) of a master cell group (MCG); the UE initiating a fast MCG link recovery procedure to recover a connection to a network side; and the UE transmitting a radio link failure report to the network side, where the radio link failure report comprises first fast MCG link recovery information, and the first fast MCG link recovery information is used to indicate that the UE has attempted a fast MCG link recovery function based on the fast MCG link recovery procedure after the RLF that is associated to the radio link failure report.

In the radio link failure reporting method of the first aspect above, the radio link failure report may further comprise at least one of second fast MCG link recovery information and third fast MCG link recovery information. The second fast MCG link recovery information may be used to indicate that the UE has received a response RRC message from the network side after transmitting an RRC message to the network side in the fast MCG link recovery function. The third fast MCG link recovery information may be used to indicate that the UE has received a cell identity of a handover target cell comprised in an RRC reconfiguration (RRCreconfiguration) message after transmitting the RRC message to the network side in the fast MCG link recovery function.

In the radio link failure reporting method of the first aspect above, the radio link failure report may further comprise fourth fast MCG link recovery information. The fourth fast MCG link recovery information may be used to indicate that the UE has not received the response RRC message from the network side after transmitting the RRC message to the network side in the fast MCG link recovery function.

In the radio link failure reporting method of the first aspect above, the RRC message may include MCG failure information (MCGfailureinformation).

In the radio link failure reporting method of the first aspect above, the response RRC message may comprise: the RRC reconfiguration (RRCreconfiguration) message for instructing the UE to execute a handover, or an RRC release (RRCrelease) message for releasing an RRC connection.

In the radio link failure reporting method of the first aspect above, the second fast MCG link recovery information may further indicate the type of the message received by the UE, and the message type comprises: the RRC reconfiguration (RRCreconfiguration) message and the RRC release (RRCrelease) message.

In the radio link failure reporting method of the first aspect above, the cell identity may be indicated by a frequencyInfoDL information element and a physCellid information element included in a reconfigurationWithSync information element.

In the radio link failure reporting method of the first aspect above, the frequencyInfoDL information element may indicate a downlink carrier and basic parameters of transmission thereon, and the physCellid information element indicates a physical cell identity.

In the radio link failure reporting method of the first aspect above, the UE may initiate the fast MCG link recovery procedure when a specified condition is satisfied, and the specified condition comprises: the UE being configured with a fast MCG link recovery parameter, i.e., a timer T316, the UE being configured with a split SRB or SRB3, neither the MCG nor an SCG being in a suspended state, and the timer T316 not running, where the timer T316 is used to monitor the fast MCG link recovery procedure.

According to a second aspect of the present disclosure, provided is user equipment (UE), comprising: a processor; and a memory storing instructions, wherein the instructions, when run by the processor, perform the radio link failure reporting method described herein.

BRIEF DESCRIPTION OF THE DRAWINGS

In order to understand the present disclosure and advantages thereof more fully, reference will now be made to the following description made in conjunction with the accompanying drawings.

In the drawings, identical or similar structures are marked by identical or similar reference numerals.

DETAILED DESCRIPTION

Figure 1:
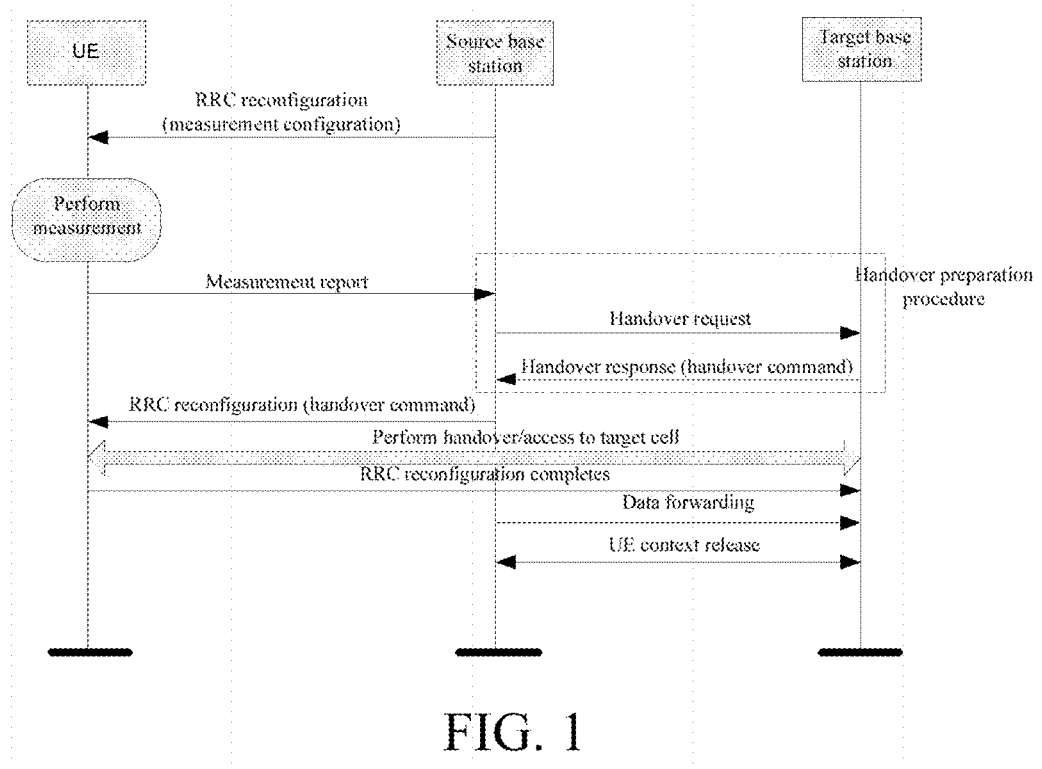
FIG. 1 is a sequence diagram showing that user equipment (UE) in a connected state changes a serving cell by means of a handover procedure.

According to the following detailed description of exemplary embodiments of the present disclosure made in conjunction with the accompanying drawings, other aspects, advantages, and prominent features of the present disclosure will become apparent to those skilled in the art.

In the present disclosure, the terms "include" and "comprise" and derivatives thereof mean inclusion without limitation; the term "or" may have an inclusive meaning and means "and/or".

In the present specification, the following various embodiments for describing the principles of the present disclosure are merely illustrative, and should not be interpreted in any way as limiting the scope of the disclosure. The following description with reference to the accompanying drawings is used to facilitate full understanding of the exemplary embodiments of the present disclosure defined by the claims and equivalents thereof. The following description includes a variety of specific details to facilitate understanding, but these details should be considered merely exemplary. Therefore, those of ordinary skill in the art should recognize that various changes and modifications may be made to the embodiments described herein without departing from the scope and spirit of the present disclosure. In addition, the description of the known function and structure is omitted for clarity and simplicity. In addition, the same reference numerals are used for similar functions and operations throughout the accompanying drawings.

A plurality of embodiments according to the present disclosure are specifically described below by using a Long Term Evolution (LTE)/NR mobile communication system and subsequent evolved versions thereof as an exemplary application environment. However, it is to be noted that the present disclosure is not limited to the following embodiments, but may be applied to other wireless communications systems. In the present disclosure, unless otherwise specified, the concept of a cell and the concept of a base station are interchangeable. An LTE system may also refer to a 5G LTE system and a post-5G LTE system (such as an LTE system referred to as an eLTE system or an LTE system that can be connected to a 5G core network). In addition, the LTE can be replaced with an evolved universal terrestrial radio access (E-UTRA) or an evolved universal terrestrial radio access network (E-UTRAN). In the present disclosure, a handover refers to change of a primary cell initiated by a network side, the change including inter-cell change of the primary cell and intra-cell change of the primary cell. That is, a primary cell of UE is changed from a source cell to a target cell, where the source cell and the target cell may be the same cell or different cells. In this procedure, a security key or a security algorithm for access layer security may also be accordingly updated. The source cell is also referred to as a source base station, or may also be a source beam or a source transmission point (TRP). The target cell may also be referred to as a target base station, or may also be a target beam or a target transmission point. The source cell refers to a cell connected to serve the UE before a handover procedure is initiated, that is, a cell from which the UE receives an RRC message including a handover command. The target cell refers to a cell connected to serve the UE after the handover procedure is successfully completed, or a cell indicated by a target cell identity included in the handover command, or a cell that the UE accesses when being instructed to execute a handover. The handover command described in the present disclosure is used to trigger the UE to execute a handover. In an NR system, the handover command is an RRC reconfiguration message including a reconfiguration with sync (Reconfigurationwithsync) information element, or rather, the handover command is an RRC reconfiguration message including a reconfiguration with sync (Reconfigurationwithsync) information element for a master cell group (MCG). At this time, a handover may also be referred to as reconfiguration with sync for an MCG. In an LTE system, the handover command is an RRC connection reconfiguration message including a mobility control information (MobilityControlInformation) information element. The reconfiguration with sync information element or the mobility control information information element includes configuration information of the target cell, for example, the target cell identity, a target cell frequency, common configurations of the target cell such as system information, a random access configuration used by the UE to access the target cell, a security parameter configuration of the UE in the target cell, a radio bearer configuration of the UE in the target cell, and the like. For simplicity of description, in the present disclosure, the RRC reconfiguration message is equivalent to the RRC connection reconfiguration message; similarly, an RRC reconfiguration complete message serving as a response message thereto is equivalent to an RRC connection reconfiguration complete message. An RRC connection re-establishment request message is equivalent to an RRC re-establishment request message, and an RRC re-establishment message is equivalent to an RRC connection re-establishment message; similarly, an RRC re-establishment complete message serving as a response message thereto is equivalent to an RRC connection re-establishment complete message. The handover command is equivalent to the RRC message including the handover command, and refers to an RRC message or a configuration in the RRC message triggering the UE to execute a handover. The handover configuration refers to all of or part of configurations in the handover command "Cancel", "release", "delete", "flush", and "clear" are interchangeable. "Execute", "use", and "apply" are interchangeable. "Configure" and "reconfigure" are interchangeable. "Link" and "connection" are interchangeable. "Monitor" and "detect" are interchangeable.

The prior art involved in the embodiment of the present disclosure will be briefly described below.

General Handover Procedure in an Existing Mechanism:

User mobility in a connected state is implemented mainly by means of a handover procedure, and the handover refers to a procedure in which UE in an RRC connected state changes a serving cell. FIG. 1 is a sequence diagram showing that user equipment (UE) in a connected state changes a serving cell by means of a handover procedure. As shown in FIG. 1, the handover procedure generally includes the following phases:

Phase 1, a measurement phase. A base station issues a measurement configuration to user equipment (UE); the UE performs, on the basis of the measurement configuration, measurement on a radio link corresponding to a serving cell or a neighboring cell; when a configured measurement reporting condition is met, the UE transmits a measurement report to the base station. The measurement phase is not mandatory, and the base station may also perform a blind handover to UE if the base station does not have any valid measurement report.

Phase 2, a handover preparation phase. The base station determines, according to the received measurement report and other factors such as load of the base station, whether to trigger a handover for the UE. If it is determined to trigger a handover for the UE, then a source base station initiates a handover preparation procedure by transmitting a handover request message to a target base station. The target base station determines, according to the context of the UE in the handover request message, available resources of the target base station, and other factors, whether to accept this handover request of the UE. If so, then the target base station replies to the source base station with a handover acknowledgment message, wherein the handover acknowledgment message includes an inter-node RRC message, namely, a handover command.

Phase 3, a handover execution phase. The source base station issues the handover command to the UE, and starts to forward data of the UE to the target base station. UE receiving the handover command immediately uses a configuration in the handover command to execute a handover, accesses the target base station by means of a random access procedure, and transmits an acknowledgment message to the target base station. The random access procedure is not mandatory.

Phase 4, a handover completion phase. After confirming that the UE successfully accesses the target base station, the target base station transmits a handover complete message to the source base station. According to the handover complete message, the source base station may release the UE context stored thereon.

Figure 2:
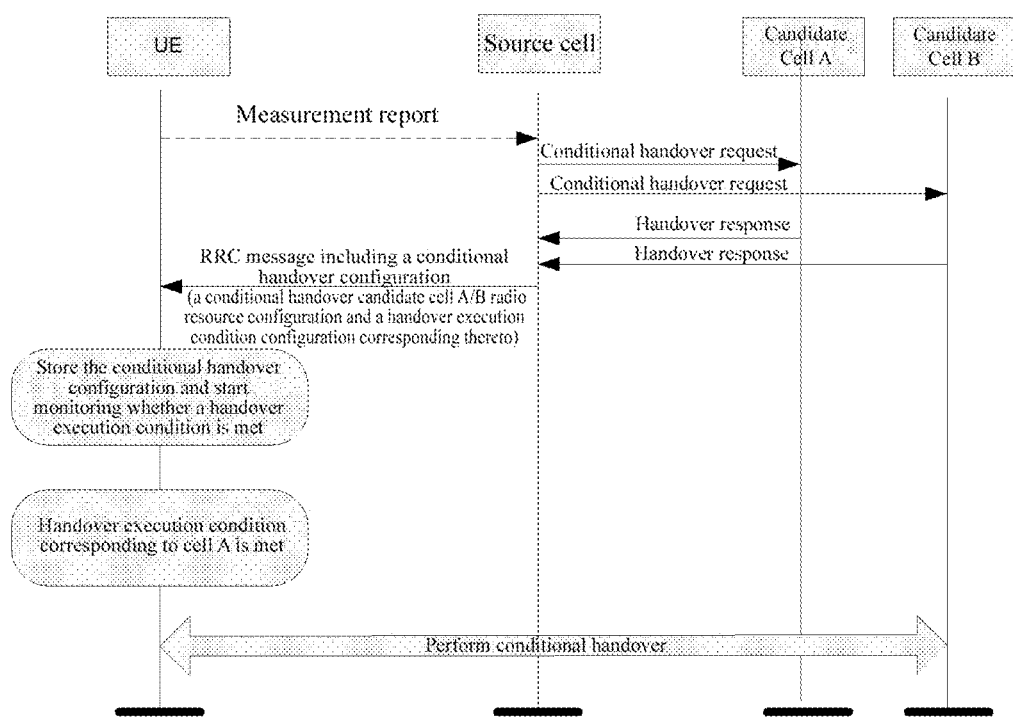
FIG. 2 is a schematic diagram showing a flow of a conditional handover.

Conditional Handover:

Secondly, the conditional handover is briefly described. As described above, requirements of Release 16 technologies include a data interruption delay possible of "0 ms" in a mobility handover procedure and improved robustness of a handover so as to meet mobility requirements for a seamless handover in the NR. In the current handover procedure, one reason for a handover failure and therefore a long data transmission interruption is a handover command receiving failure caused when the handover command is not delivered in a timely manner A feasible method to address this problem is a handover based on condition (referred to simply as a conditional handover). FIG. 2 is a schematic diagram showing a flow of a conditional handover. In the conditional handover, a relatively conservative measurement report threshold is set, so that a base station acquires a measurement result in advance, and performs handover preparation with a selected target base station in advance according to the measurement result. In this case, the base station can issue a handover command including a handover candidate cell and a handover execution condition to UE before an actual handover condition (relative to the conservative measurement report threshold) is met, wherein the handover command carries a condition for executing a handover by the UE. Different from the existing handover mechanism, after receiving the conditional handover command, the UE does not execute a handover immediately but stores a received handover command configuration, and starts to monitor link quality of a source cell or link quality of a target cell according to the handover execution condition carried in the handover command message, to evaluate whether the handover execution condition is met. Only when it is determined, by means of monitoring, that the configured handover execution condition is met, does the UE start to execute the stored handover command and access the target cell. In summary, the conditional handover refers to a handover procedure that is executed only when one or more configured handover execution conditions are met. As for the handover execution condition, for example, the handover execution condition is a measurement event. For example, the condition is measurement event A3 (signal quality in a neighboring cell is better than that in a serving cell by an offset value for a period of time). The neighboring cell corresponds to the target cell for handover. Generally, all of measurement events defined in the current 3GPP standard specifications 36.331 and 38.331 (see section 5.5.4), such as A1-A5, can be included in the conditional handover command as the handover execution condition. Because the handover command is included in the RRC reconfiguration message, the conditional handover CHO is also referred to as conditional reconfiguration.

Link Recovery Function in the Existing Mechanism:

Next, the link recovery function in the existing mechanism, i.e., Release 15 and earlier, is introduced. In the existing mechanism, after UE detects a radio link failure (RLF) of a master cell group or a handover procedure performed by the UE fails (handover failure, HOF) (i.e., T304 expires), the UE initiates an RRC connection re-establishment procedure to re-establish/recover a connection to a network side. In the initiated RRC connection re-establishment procedure, the UE firstly performs a cell selection procedure to select a re-establishment cell, and transmits an RRC connection re-establishment request message to the cell. When the UE receives an RRC connection re-establishment message serving as a response message, the UE re-establishes an RRC connection according to a configuration in the RRC connection re-establishment message, and feeds back an RRC connection re-establishment complete message to a base station to successfully end the RRC connection re-establishment procedure. The re-establishment cell refers to a cell for the UE to transmit the RRC connection re-establishment request message and receive the corresponding response message for re-establishing the RRC connection in an RRC connected state. A timer T311 is defined in the RRC re-establishment procedure. The T311 is started when the UE initiates the RRC connection re-establishment procedure. When a suitable cell for re-establishment is selected in the cell selection procedure, the T311 stops; and if the UE cannot select a suitable cell when the T311 expires, at this time, it is generally considered that the UE is out of coverage and the UE will leave the RRC connected state to enter an RRC idle state or an RRC inactive state (RRC_Inactive).

Link Failure Reporting Mechanism in the Existing Mechanism:

In a current LTE system and an NR system of Release 16, UE will generate and store a radio link failure report (RLF report) when a link failure or handover failure occurs, that is, a UE variable used to store the radio link failure report is VarRLF-Report. After a connection to a network side (e.g., through an RRC re-establishment procedure or an RRC establishment procedure) is recovered, the UE can inform the network side by using an RRC message that there is the available radio link failure report thereon (indicated by an rlf-InfoAvailable information element). For example, the UE can inform the network side that the UE has the stored available radio link failure report in an RRC connection re-establishment complete message (RRCConnectionReestablishmentComplete) in an RRC connection re-establishment procedure, in an RRC connection re-configuration complete message (RRCConnectionReconfigurationComplete) in an RRC connection re-configuration procedure, in an RRC connection setup complete message (RRCConnectionSetupComplete) in an RRC connection setup procedure, or in an RRC connection resume complete message (RRCConnectionResumeComplete) in an RRC connection resumption procedure. After receiving the indication, the network side may request, by using an RRC message (an rlf-ReportReq information element in a UEInformationRequest message to indicate the request), the UE to report the radio link failure report stored thereby. The UE will report the stored radio link failure report (an rlf-Report information element in a UEInformationResponse message) to the network side in a response RRC message. The radio link failure report obtained by the network side is used for network optimization, such as network coverage and mobility robustness optimization. The radio link failure report may include: measurement results of a source cell and neighbor cell(s) available when a link fails, location information, the identity of a primary cell where the link failure occurs, the type of the link failure (RLF or HOF), an RLF cause, elapsed time between the connection failure and reporting of the radio link failure, elapsed time between reception of a last handover command and the connection failure (referred to as a timeConnFailure information element), etc. Besides, an RRC re-establishment cell identity in the radio link failure report can provide additional auxiliary information for the network side. For example, if there is no RRC re-establishment cell information in the radio link failure report, the network side may consider that the UE has not found any suitable cell during a radio link recovery procedure, i.e., an RRC connection re-establishment procedure, after the link failure, in which case the UE may be in a network coverage hole when the radio link failure occurs; if the RRC re-establishment cell identity in the radio link failure report is not the source cell where the UE is located when the failure occurs, the network side may consider that the failure of the UE is not caused by too early handover. The aforementioned RRC re-establishment cell identity is the identity of an RRC re-establishment cell that the UE attempts to re-establish an RRC connection to and is included in the radio link failure report after triggering an RRC connection re-establishment request message during the RRC connection re-establishment procedure.

Fast MCG Link Recovery Function:

The dual connectivity and carrier aggregation enhancement project in Release 16 (see document RP-190452) discusses a fast MCG link recovery function. The so-called "fast" is provided relative to the existing link recovery function (i.e., recovering a link connection by means of an RRC connection re-establishment procedure). In the fast MCG link recovery function, when an RLF occurs in an MCG of the UE, if the link quality of a secondary cell group (SCG) of the UE is good (that is, no RLF occurs or a timer T310 is not running, or the SCG is not suspended), in which case neither the MCG nor the SCG is in the suspended (or interrupted) state or the timer T316 is not running, then the UE initiates an MCG failure information procedure, and reports the MCG link failure information to a master base station via an SCG link (such as a split signaling radio bearer (SRB) or a third signaling radio bearer SRB3) instead of directly triggering an RRC connection re-establishment procedure. In the MCG failure information procedure, the UE will suspend the MCG transmission of all SRBs and DRBs except SRB0, and reset a MAC entity corresponding to the MCG. The master base station receiving the MCG link failure information report may transmit an RRC connection reconfiguration message including a reconfiguration with sync information element to the UE to trigger a handover of the UE to a new cell, or transmit an RRC release message to release an RRC connection of the UE. This fast MCG link recovery function/procedure can be applied to the case in which multi-radio access technology dual connectivity (MR-DC), for example, NR E-UTRA dual connectivity (NE-DC), E-UTRA NR dual connectivity (EN-DC), new radio dual connectivity (NR DC), next generation-radio access network E-UTRA NR dual connectivity (NGEN-DC), intra-E-UTRAN DC (LTE DC), or the like, is configured. In the present disclosure, the MCG failure information procedure and the fast MCG link recovery procedure are equivalent.

Radio Link Recovery Function Using a Stored Conditional Handover Configuration:

After the UE is configured with a conditional handover, the UE does not execute a handover immediately, but executes the handover according to a received or stored conditional handover configuration after a corresponding condition is met. During a period from a time when the UE receives the conditional handover configuration to a time when the UE executes the handover according to the received conditional handover configuration, the UE still maintains communication with a source base station. During this time period, a radio link failure (RLF) between the UE and the source base station may occur. The 3GPP RAN2 working group introduced a link recovery enhancement mechanism: when the RLF occurs, the UE selects a cell to perform link recovery by means of a cell selection procedure in an RRC connection re-establishment procedure (that is, when a T311 timer is running) If the selected cell is a conditional handover candidate cell, then the UE executes a handover to the cell according to a conditional handover configuration corresponding to the cell; if the selected cell is not a conditional handover candidate cell, the UE transmits an RRC connection re-establishment request to the selected cell to attempt to recover the connection to the network side. In the present disclosure, the enhancement of the link recovery function is referred to as a link failure recovery mechanism based on a conditional handover configuration (for simplicity of description, this mechanism is referred to as a conditional handover link recovery function), this is also applicable to a HOF case. The network side enables this function of the UE by setting a CHO recovery information element (referred to as an attemptCondReconf information element) in a CHO configuration to true. For the UE with this function enabled, if a cell selected in a first cell selection procedure after an RLF/HOF is a target candidate cell, the UE can execute a CHO to this cell. In a Release 16 system, the UE is only allowed to execute CHO recovery after a failure once. The conditional handover candidate cell refers to a (target) cell in the conditional handover configuration in the RRC message for configuring the conditional handover received by the UE, namely, a cell indicated by a cell identity in the reconfiguration with sync information element (ReconfigurationWithSync) or the mobility control information element (MobilityControlInfo). The network side may configure one or more handover execution condition candidate cells for the UE at the same time.

As mentioned above, the network side can determine an RLF scenario by obtaining a re-establishment cell identity in an RLF report, so as to better optimize network parameters. In the existing mechanism, the UE will only include the re-establishment cell identity in the radio link failure report after triggering the RRC connection re-establishment request message when attempting the RRC connection re-establishment procedure to the network side. However, in the fast MCG link recovery function, the existing mechanism cannot accomplish this function, which is a concern of the present disclosure. By means of the method described in the present disclosure, the UE can include the identity of the cell for which connection recovery is attempted in the fast MCG link recovery function in the radio link failure report and report the radio link failure report to the network side, thereby providing more auxiliary information for the network side to optimize mobility performance.

In addition, when the UE is configured with the CHO recovery mechanism, if the UE detects a link failure (RLF or HOF), the UE can execute a CHO to recover a link. If the executed CHO also fails, the UE will experience two consecutive link failures. In an existing system, the radio link failure report only records information of the latest link failure. How to set link failure information in the case of two consecutive link failures is also a concern of the present disclosure.

In addition, as mentioned above, the timeConnFailure information element included in the radio link failure report is used to record the time elapsed from the last time the UE receives the RRC reconfiguration message including the reconfiguration with sync (reconfigurationwithsync) information element to the occurrence of the radio link failure to generate the corresponding RLF report. This cannot handle the situation where the UE is configured with a CHO. Therefore, the present disclosure is also concerned about the issue of how to set the timeConnFailure information element in the radio link failure report when the UE is configured with the CHO.

Several embodiments performed on the UE based on the above problem in the present disclosure are as follows. In the following embodiment, the UE is configured with the conditional handover, which means that the UE receives an RRC message including a conditional handover command from a base station, stores a handover configuration in the handover command, and determines, by means of monitoring and according to a handover execution condition, whether the handover execution condition is met. The handover configuration refers to an RRC configuration generated by the UE according to the configuration in the handover command Optionally, the handover configuration refers to an RRC configuration generated by the UE according to a configuration in the handover command and/or a current RRC configuration of the UE.

Embodiment 1

This embodiment provides a method for setting a fast MCG link recovery procedure in a radio link failure report in a fast MCG link recovery function when a radio link fails. UE includes information that the UE has attempted a fast MCG link recovery procedure in a radio link failure report and reports the radio link failure report to a network side, such that on the basis of this information, the network side can learn that the UE has performed the fast MCG link recovery procedure after a radio link failure, thereby performing more accurate network problem location to optimize network configuration parameters such as a handover threshold parameter.

Figure 3:
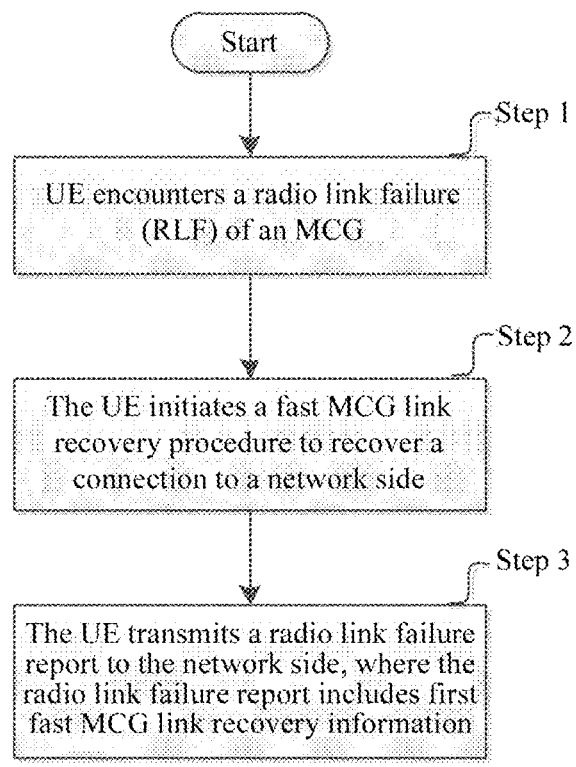
FIG. 3 is a flowchart showing a radio link failure reporting method according to Embodiment 1.

As an example, FIG. 3 is a flowchart showing a radio link failure reporting method according to Embodiment 1. As shown in FIG. 3, the radio link failure reporting method in Embodiment 1 may include the following steps.

Step 1: UE detects a radio link failure (RLF) of an MCG.

Step 2: The UE initiates an MCG failure information procedure to recover a connection to a network side, the MCG failure information procedure being also referred to as a fast MCG link recovery procedure.

As mentioned above, the UE usually initiates the MCG failure information procedure only when the following conditions are met: the UE is configured with a parameter for fast MCG link recovery, i.e., a timer T316, the UE is configured with a split SRB or SRB3, the MCG and an SCG are not suspended, and the timer T316 is not running.

The timer T316 is used to monitor the MCG failure information procedure. The UE starts T316 when transmitting an MCGfailureinformation message. T316 is stopped when MCG transmission is resumed, or when a response RRCrelease message is received from the network side, or when an RRC re-establishment procedure is initiated. When T316 expires, the UE considers that the fast MCG link recovery procedure has failed and ended, and thus triggers an RRC re-establishment procedure to attempt to recover the connection to the network side.

Step 3: The UE sends a radio link failure report to the network side, where the radio link failure report may include first fast MCG link recovery information. The first fast MCG link recovery information is used to indicate that the UE has attempted a fast MCG link recovery function based on the fast MCG link recovery procedure after a radio link failure corresponding to the radio link failure report.

In an implementation manner, the UE may further include second fast MCG link recovery information in the RLF report. The second fast MCG link recovery information is used to indicate that after the UE transmits the RRC message of MCGfailureinformation to the network side in the fast MCG link recovery function that the UE attempts after the radio link failure corresponding to the radio link failure report, the UE has received a response RRC message from the network side (for example, the response RRC message is an RRCreconfiguration message including a reconfigurationWithSync information element for instructing the UE to execute a handover or an RRCrelease message for releasing an RRC connection). Furthermore, the second fast MCG link recovery information may further indicate the type of the message received by the UE, for example, the message may be the RRCreconfiguration message or the RRCrelease message.

In another implementation manner, the UE may further include third fast MCG link recovery information in the RLF report. The third fast MCG link recovery information includes a cell identity, which is used to indicate that after the UE transmits the RRC message of MCGfailureinformation to the network side in the fast MCG link recovery function that the UE attempts after the radio link failure corresponding to the radio link failure report, the UE has received the identity of a handover target cell in the RRCreconfiguration message including the reconfigurationWithSync information element. Preferably, the cell identity is indicated by a frequencyInfoDL information element and a physCellid information element included in the reconfigurationWithSync information element. Wherein, the frequencyInfoDL information element indicates a downlink carrier and basic parameters of transmission thereon; the physCellid information element indicates a physical cell identity.

In yet another implementation manner, the UE may further include fourth fast MCG link recovery information in the RLF report. The fourth fast MCG link recovery information is used to indicate that after the UE transmits the RRC message of MCGfailureinformation to the network side in the fast MCG link recovery function that the UE attempts after the radio link failure corresponding to the radio link failure report, the UE has not received the response RRC message from the network side, that is, a T316 expiry occurs, and the fast MCG link recovery procedure is unsuccessful.

For the aforementioned first to fourth fast MCG link recovery information, the UE may include one or more of the same in the RLF report.

Preferably, after the fast MCG link recovery procedure ends, the UE may include the aforementioned first to fourth fast MCG link recovery information in the RLF report. The end of the fast MCG link recovery procedure may be a successful end (when the response message is received from the network side during the running of T316, or described as when T316 is stopped) or an unsuccessful end (T316 expires, and no response message is received from the network side). Alternatively, the UE includes the aforementioned first fast MCG link recovery information in the RLF report when the fast MCG link recovery procedure is initiated, for example, when the RRC message of MCGfailureinformation is transmitted or before the message is transmitted. Alternatively, the UE includes the third fast MCG link recovery information in the RLF report when initiating a handover to the target cell according to the RRCreconfiguration message received in the fast MCG link recovery procedure. The time when the handover to the target cell is initiated may also be a time when the RRCreconfiguration message is applied.

Embodiment 2

This embodiment provides a method for reporting failure information when a fast MCG link recovery function is performed upon a radio link failure. UE implementing the fast MCG link recovery function includes the corresponding link failure information in an MCGfailureinformation message and reports the message to a network side without storing or reporting an RLF report to the network side via UEinformationresponse message.

In this embodiment, if the UE is configured with the fast MCG link recovery function or the UE initiates the fast MCG link recovery function to recover a connection to the network side, the UE includes the link failure related information in the MCGfailureinformation message and reports the message to the network side. Preferably, when the RLF occurs, if the UE is configured with the fast MCG link recovery function, the UE does not store the RLF report information for this RLF in an RLF report variable VarRLF-report. Alternatively, when the UE initiates the fast MCG link recovery function, for example, at an initialization phase of the fast MCG link recovery function or when the MCGfailureinformation message is transmitted, the stored RLF report corresponding to this RLF is deleted from the UE. Alternatively, when the UE receives a response RRC message from the network side during the fast MCG link recovery procedure, the stored RLF report corresponding to this RLF is deleted from the UE. Alternatively, when the UE receives a UEinformationrequest message from the network side for requesting the UE to report the RLF report (an rlf-ReportReq information element is set to true), if the UE has executed the fast MCG link recovery function after a link failure corresponding to the RLF report, the UE does not include the RLF report in a corresponding UEinformationresponse message. Alternatively, if there is the stored RLF report on the UE but the condition that the UE is configured with the fast MCG link recovery function when the RLF occurs is not met, or the condition that the UE has executed the fast MCG link recovery function after the RLF occurs is not met, then when transmitting an uplink RRC message, the UE includes an rlf-InfoAvailable information element in the RRC message. Preferably, the uplink RRC message is an RRC connection re-establishment complete message, an RRC connection reconfiguration complete message, an RRC connection setup complete message, or an RRC connection resume complete message.

Embodiment 3

This embodiment provides a method performed at UE for setting an RLF report when a CHO recovery mechanism is adopted when a radio link fails. The UE includes information that the UE has attempted a CHO recovery mechanism in a radio link failure report and reports the radio link failure report to a network side, such that the network side can learn, based on this information, that the UE has executed the CHO recovery mechanism after the radio link fails, so as to perform more accurate network problem location to optimize network configuration parameters such as a conditional handover threshold parameter. As an example, the RLF report setting method of Embodiment 3 may include the following steps.

Step 1: The UE initiates an RRC re-establishment procedure. The UE triggers the RRC re-establishment procedure when an MCG RLF or a handover failure occurs (a timer T304 expires).

Step 2: In a cell selection procedure in the RRC connection re-establishment procedure, that is, when T311 is running, when a suitable cell is selected, if the selected cell is a conditional handover candidate cell of the UE, step 3A is performed; otherwise, if the selected cell is not a conditional handover candidate cell of the UE, step 3B is performed.

That the selected cell is a conditional handover candidate cell of the UE may be described as that the selected cell is one of candidate cells in a conditional handover configuration stored by the UE. A master cell group configuration in the conditional handover configuration corresponding to the candidate cell includes a reconfigurationWithSync information element.

Preferably, in an NR system, the selected suitable cell is an NR cell; in an LTE system, the selected suitable cell is an LTE/E-UTRAN cell.

Step 3A: The UE performs the following operations:

Operation 1: The UE executes a conditional handover to the selected cell, initiates a conditional handover procedure, applies the stored conditional handover configuration of the cell, and performs access to the selected cell.

Operation 2: The UE includes first CHO recovery information in an RLF report (VarRLF-Report), which is used to indicate that the UE has selected a CHO candidate cell and executed a CHO recovery mechanism during the cell selection procedure (T311 is running) after the RLF/HOF.

In an implementation manner, the UE may further include second CHO recovery information in the RLF report, which is used to indicate whether a CHO execution condition corresponding to the CHO candidate cell selected by the UE in the cell selection procedure after the RLF/HOF is met when the operation is performed.

In another implementation manner, the UE may further include a third CHO recovery message in the RLF report, which is used to indicate whether the executed conditional handover corresponding to the CHO candidate cell selected by the UE in the cell selection procedure after the RLF/HOF is successful. That the executed conditional handover is successful means that the UE successfully accesses the corresponding target cell, and the corresponding random access procedure is successfully completed. That the executed conditional handover is unsuccessful means that the timer T304 corresponding to the conditional handover has expired.

The order of implementation of operation 1 and operation 2 is not limited. Operation 2 may be performed before operation 1, that is, after the UE determines that the suitable cell selected in the cell selection procedure in step 2 is the conditional handover candidate cell, operation 2 is performed. In another manner, operation 2 may be completed after operation 1 or when operation 1 is being performed, for example, the UE performs operation 1 at an initialization phase of the conditional handover initiated in operation 1. However, the third CHO recovery information is executed after operation 1 is completed successfully or unsuccessfully.

Step 3B: Continue the RRC connection re-establishment procedure, such as initiating transmission of an RRC connection re-establishment request message.

Optionally, as described above, the determination by the UE of whether the selected cell is a conditional handover candidate cell of the UE is performed when the UE is configured with the conditional handover and/or a cause for initiating the RRC connection re-establishment procedure (or a cause for cell selection performed in the RRC connection re-establishment procedure) is that an RLF of an MCG or a handover failure is detected (that is, a timer (such as T304) for monitoring the handover procedure expires, also including a conditional handover failure herein). Optionally, the determination by the UE of whether the selected cell is a conditional handover candidate cell of the UE is performed when the UE is enabled with a conditional handover (CHO) recovery mechanism.

The selected cell being a conditional handover candidate cell may also be that the selected cell is included in the stored conditional handover configuration, and preferably, the selected cell is included in a reconfiguration with sync information element (ReconfigurationWithSync) in the stored conditional handover configuration or a mobile control information information element. The UE executes a handover to the selected cell, that is, a handover to this cell is executed according to the stored conditional handover configuration corresponding to this cell (or referred to as a reconfiguration with sync). The operation of executing a conditional handover includes one or a plurality of the following: a timer T304 is started; a target cell RRC configuration in a conditional handover configuration corresponding to a target cell is executed; a configuration in a reconfiguration with sync information element corresponding to the target cell is executed; downlink synchronization to the target cell is performed; random access to the target cell is performed; and an RRC reconfiguration complete message is generated and submitted to a lower layer, and is transmitted.

Embodiment 4

This embodiment provides a method for UE to report an RLF report to a network, which is performed when the UE is configured with a conditional handover.

In this embodiment, when the UE detects an RLF or a HOF (T304 expires), when the UE stores the RLF or HOF information in the RLF report (VarRLF-Report variable), a timeConnFailure information element can be set, for example, in the following modes:

Mode 1: Set the value of the timeConnFailure information element to time elapsed from the last (most recent) handover procedure performed by the UE. In an NR system, the execution of the handover means performing or applying a reconfiguration with sync (reconfigurationWithSync) procedure in an RRC reconfiguration message. Preferably, mode 1 is performed when the last executed handover procedure is a conditional handover, that is, the execution of the handover refers to executing a stored corresponding conditional handover configuration when a handover execution condition is met.

Mode 2: If the UE is configured with a CHO, that is, the UE has a stored CHO configuration, set the value of the timeConnFailure information element to time elapsed from the last (most recent) RRC reconfiguration message received by the UE including a CHO configuration for an MCG. The RRC reconfiguration message including the CHO configuration may be an RRC reconfiguration message including a CHO execution condition configuration or a reconfigurationWithSync information element corresponding to a CHO candidate cell. Preferably, the CHO configuration is not used to release the CHO configuration stored on the UE.

In another implementation manner, the UE may include first CHO information in the RLF report, the first CHO information being used to indicate whether the UE is configured with the CHO when the RLF or HOF occurs, that is, whether the UE has the stored CHO configuration. Further, the UE includes second CHO information in the RLF report, the second CHO information including one or more cell identities, which are used to indicate those CHO candidate cells that the UE is configured with when the RLF or HOF occurs. The cell identity may be a downlink carrier frequency and a physical cell identity corresponding to the cell, or may be a cell global identity, or a CHO configuration identifier. The CHO configuration identifier is used to identify one CHO configuration, and the UE can be configured with a plurality of CHO configurations at the same time.

Embodiment 5

Figure 4:
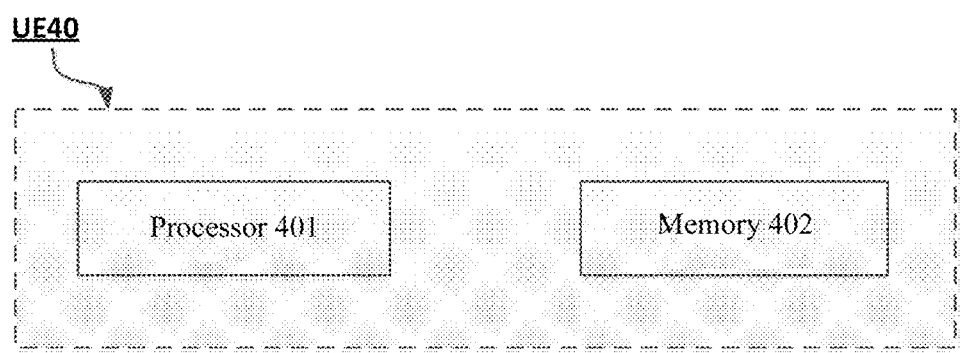
FIG. 4 is a block diagram showing user equipment (UE) related to the present disclosure.

In this embodiment, user equipment according to the present disclosure is described. FIG. 4 is a block diagram showing the user equipment (UE) involved in the present invention. As shown in FIG. 4, the user equipment (UE) 40 includes a processor 401 and a memory 402. The processor 401 may include, for example, a microprocessor, a microcontroller, an embedded processor, and the like. The memory 402 may include, for example, a volatile memory (for example, a random access memory (RAM)), a hard disk drive (HDD), a non-volatile memory (for example, a flash memory), or other memory systems. The memory 402 stores program instructions. When the instructions are executed by the processor 401, various methods such as the above radio link failure reporting method and radio link failure setting method described in detail in the present invention can be performed.

In the present disclosure, some different embodiments can cooperate with each other.

In the present disclosure, the term "base station" refers to a mobile communication data and control switching center with a larger transmit power and a wider coverage area, and has functions of resource distribution scheduling, data receiving and transmitting, and the like. The term "user equipment" refers to a user mobile terminal, for example, a terminal device capable of performing wireless communication with a base station or a micro base station, including a mobile phone, a notebook computer and the like.

The methods and related devices according to the present disclosure have been described above in conjunction with preferred embodiments. It should be understood by those skilled in the art that the methods shown above are only exemplary. The method according to the present disclosure is not limited to steps or sequences shown above. The base station and user equipment shown above may include more modules. For example, the base station and user equipment may further include modules that may be developed or will be developed in the future to be applied to a base station, an MME, or UE. Various identifiers shown above are only exemplary, not for limitation, and the present disclosure is not limited to specific information elements serving as examples of these identifiers. A person skilled in the art could make various alterations and modifications according to the teachings of the illustrated embodiments.

The program running on the device according to the present disclosure may be a program that enables a computer to implement the functions of the embodiments of the present disclosure by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions may be achieved by reading programs recorded on the recording medium and executing them by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (e.g., monolithic or multi-piece integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications may be made to the present disclosure within the scope of the claims. Embodiments resulted from the appropriate combinations of the technical means disclosed in different embodiments are also included within the technical scope of the present disclosure. In addition, components with the same effect described in the above embodiments may be replaced with one another.

The invention claimed is:

1. A user equipment (UE), comprising:
a processor; and
a memory storing instructions, wherein, on the basis of the instructions, the processor is configured to:
store a radio link failure (RLF) report in a variable VarRLF-Report upon a radio link failure;
upon initiating a master cell group (MCG) failure information procedure, send an MCG failure information message to a network, and start a timer T316; and
in a case that the processor receives, from the network and while the timer T316 is running, an RRC release message, or an RRC reconfiguration message comprising a reconfiguration with sync information element, upon receiving the RRC release message or the RRC reconfiguration message, clear the RLF report stored in the variable VarRLF-Report.

2. A method performed by a user equipment (UE), comprising:
storing a radio link failure (RLF) report in a variable VarRLF-Report upon a radio link failure;

upon initiating a master cell group (MCG) failure information procedure, sending an MCG failure information message to a network, and starting a timer T316; and upon receiving, from the network and while the timer T316 is running, an RRC release message, or an RRC reconfiguration message comprising a reconfiguration with sync information element, clearing the RLF report stored in the variable VarRLF-Report.

3. The UE according to claim 1, wherein the processor is further configured to, in a case that the timer T316 expires:

trigger an RRC connection reestablishment procedure; and transmit the RLF report to the network, wherein the transmitted RLF report includes information used to indicate that the timer T316 expires and the MCG failure information procedure is unsuccessful.

\* \* \* \* \*